No. 614,835. Patented Nov. 29, 1898.
W. H. CARRUTHERS.
NUT LOCK.
(Application filed Mar. 14, 1898.)
(No Model.)
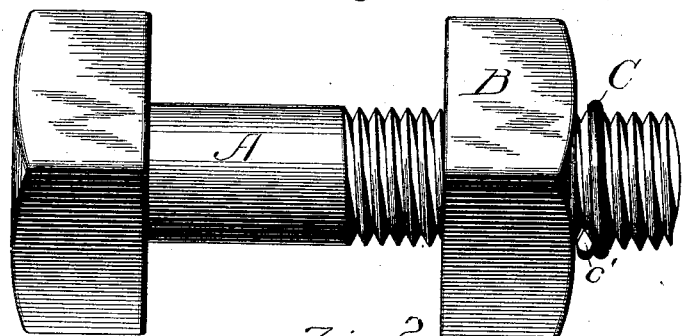
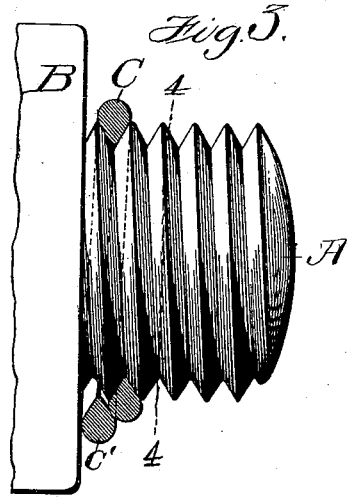
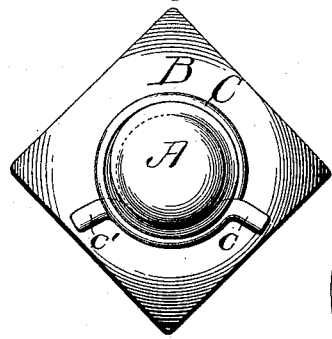
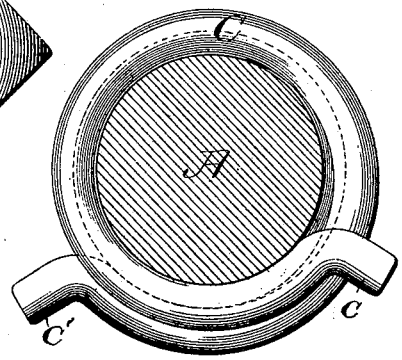
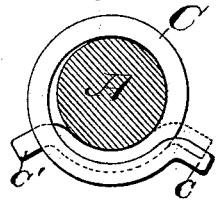
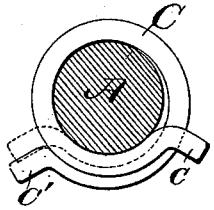
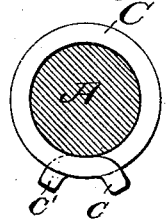
Attest:
Ralph Kalish
Wm. K. Scott
Inventor:
Wm. H. Carruthers
by Bakewell & Cornwall
Atty's.

UNITED STATES PATENT OFFICE.

WILLIAM H. CARRUTHERS, OF CHICAGO, ILLINOIS, ASSIGNOR TO MARGURETTA E. CARRUTHERS, OF SAME PLACE.

NUT-LOCK.

SPECIFICATION forming part of Letters Patent No. 614,835, dated November 29, 1898.

Application filed March 14, 1898. Serial No. 673,758. (No model.)

*To all whom it may concern:*

Be it known that I, WILLIAM H. CARRUTHERS, a citizen of the United States, residing at Chicago, in the county of Cook and State of Illinois, have made a certain new and useful Improvement in Nut-Locks, of which the following is a full, clear, and exact description, such as will enable others skilled in the art to which it appertains to make and use the same, reference being had to the accompanying drawings, forming part of this specification, in which—

Figure 1 is a side elevational view of a bolt and nut, showing my improved nut-lock in position on the bolt. Fig. 2 is an end elevational view of the same. Fig. 3 is an enlarged elevational view showing a portion of a bolt and nut, my improved nut-lock being shown in a locked position and in section. Fig. 4 is a sectional view on line 4 4, Fig. 3, the nut being omitted. Fig. 5 is a view illustrating the position of the nut-lock when the same is being screwed upon the bolt. Fig. 6 is a similar view illustrating the position of the nut-lock when the same is being unscrewed from the bolt. Fig. 7 is a view of a modified form of nut-lock, the same being in a normal position; and Figs. 8, 9, and 10 illustrate different forms of material which may be used in constructing my improved nut-lock, the same being in cross-section.

This invention relates to a new and useful improvement in nut-locks, being designed particularly as an improvement in that class of nut-locks illustrated in the patent granted Frank G. Stark March 1, 1898, No. 600,097; and it consists, generally stated, in arranging a split ring on the bolt, which ring tightly embraces said bolt, and by the friction caused by the grip thereon said ring prevents the nut from unscrewing or becoming loose.

My present invention consists in extending the ends of the ring past each other, so that when the nut is turned back and contacts with the end of the ring nearest thereto it forces the same outwardly, causing the ring to more tightly bind in the threads, the near end of the ring relative to the nut holding the farther end of the ring more firmly in position. For convenience in introducing and removing my improved nut-lock on the bolt I preferably bend the overlapping ends outwardly.

In the drawings, A indicates a bolt, and B the nut, such parts being of any ordinary or approved construction.

C indicates a coiled ring of any desired cross-section, the ends of which overlap each other and are preferably bent outwardly to offer means for turning the ring on to or off from the bolt. This ring is designed to be coiled, so that when introduced on the bolt it will tightly grip said bolt by fitting in threads thereon.

The operation of my nut-lock is as follows: In introducing the same on to a bolt the end $c$, which I will term the "rear" end, is grasped, which causes the ring to be sprung outwardly at its rear portion, as shown in Fig. 5. The lock is then turned until the end $c'$ contacts with the nut, as shown in Fig. 1. If the advance end $c'$ were grasped in this operation of introducing the lock on to the bolt, it would be a difficult task by reason of the tendency of the ring to more firmly grasp the bolt under these conditions.

If it is desired to remove the lock from the bolt, the end $c'$ is grasped and the lock turned thereby, such position being shown in Fig. 6 for reasons stated just above.

In most instances where bolts and nuts are employed the cause of a loose nut is due to the unequal pressure thereon in a direction longitudinally of the bolt. When this pressure is removed, the nut settles in its new position, and when the pressure is again applied it is directed against the nut in such new position, and therefore all rotary movement of the nut occurs during a relaxation of pressure. This being true, the only pressure brought to bear against the ring when the same is screwed against the nut, as shown in Fig. 1, is the weight of the nut itself. The resistance offered by the ring under these conditions is sufficient of itself to prevent the nut from continuing its backward rotation, and consequently the nut is locked or arrested in its position. Under severe strain it might be possible that the nut would tend to crowd the ring, and in such an event the advance end $c'$ would be sprung out of its thread, as shown in Fig. 3, and would bear against the other or overlapping end of the ring, holding the same more firmly in position in the thread, such resistance increasing in proportion to the advance of the nut until the nut is absolutely locked in place, resisting the power of a wrench. This is advantageous in that it being designed to apply and remove the ring by the use of a special tool, the ends $c$ and $c'$ being thus considerably shortened, it will prevent unauthorized persons from tampering with the nut and possibly removing the same.

In Fig. 7 the ends of the ring are shown as overlapping each other a short distance, such a construction being found to answer equally as well as that illustrated in Figs. 1 to 6.

In Fig. 3 I have shown the wire of which the lock is preferably composed as being pear-shaped in cross-section; but it is obvious that the round, diamond, or triangular cross-sections shown in Figs. 8, 9, and 10 can as well be used, as can also other forms.

I am aware that minor changes in the construction, arrangement, and combination of the several parts of my lock can be made and substituted for those herein shown and described without in the least departing from the nature and principle of my invention.

Having thus described my invention, what I claim, and desire to secure by Letters Patent, is—

1. A nut-lock comprising a coiled piece of spring metal whose ends overlap each other a short distance, said ends being bent outwardly, substantially as described.

2. The herein-described nut-lock comprising a ring whose ends overlap each other in partial convolution, the cross-section of said ring being such that, when in position, and crowded by the nut, the advance end of the ring will engage and more firmly seat its overlapping companion.

In testimony whereof I hereunto affix my signature, in the presence of two witnesses, this 26th day of February, 1898.

WILLIAM H. CARRUTHERS.

Witnesses:
F. R. CORNWALL,
HUGH K. WAGNER.